US009047261B2

(12) United States Patent
Bowling

(10) Patent No.: US 9,047,261 B2
(45) Date of Patent: Jun. 2, 2015

(54) DOCUMENT EDITING METHOD

(76) Inventor: Anthony Bowling, London (GB)

(*) Notice: Subject to any disclaimer, the term of this patent is extended or adjusted under 35 U.S.C. 154(b) by 702 days.

(21) Appl. No.: 13/252,463

(22) Filed: Oct. 4, 2011

(65) Prior Publication Data

US 2012/0072821 A1    Mar. 22, 2012

Related U.S. Application Data

(63) Continuation of application No. PCT/EP2010/054414, filed on Apr. 1, 2010.

(30) Foreign Application Priority Data

Apr. 6, 2009    (GB) .................................. 0905953.6

(51) Int. Cl.
*G06F 17/24*    (2006.01)
*G06F 17/22*    (2006.01)

(52) U.S. Cl.
CPC ............ *G06F 17/24* (2013.01); *G06F 17/2247* (2013.01)

(58) Field of Classification Search
CPC ............ G06F 3/048; G06F 8/34; G06F 8/38; G06F 17/211; G06F 17/2235; G06F 17/2247; G06F 17/248; G06F 17/3089; G06F 17/30896; G06F 17/30899; G06F 17/30905; G06F 2203/04803
USPC ......... 715/201, 202, 205, 229, 230, 234, 240, 715/255, 256, 264
See application file for complete search history.

(56) References Cited

U.S. PATENT DOCUMENTS

| 6,907,565 | B1 | 6/2005 | Huang |
| 6,981,225 | B1 * | 12/2005 | Gaudette ........................ 715/764 |
| 6,990,629 | B1 * | 1/2006 | Heaney et al. ................. 715/200 |
| 7,000,184 | B2 | 2/2006 | Matveyenko et al. |
| 7,062,492 | B1 | 6/2006 | Graham |
| 7,143,344 | B2 * | 11/2006 | Parker et al. .................. 715/236 |
| 7,191,405 | B1 * | 3/2007 | Jaramillo ...................... 715/763 |

(Continued)

FOREIGN PATENT DOCUMENTS

| EP | 0185905 A1 | 7/1986 |
| EP | 0506104 A2 | 9/1992 |

(Continued)

OTHER PUBLICATIONS

Colligan et al.; Special Edition Using Microsoft Office FrontPage 2003; 2004; Que Publishing; pp. 50-91, 276-290, and 621-640.*

(Continued)

*Primary Examiner* — Andrew Dyer
(74) *Attorney, Agent, or Firm* — EIP US LLP

(57) ABSTRACT

A method of editing a document includes receiving data associated with the document, the data including mark-up language data. The received data is processed to render at least part of the document for display in a first display area, and the at least part of the document is displayed as rendered in the first display area. The received data is processed to render the at least part of the document for display in a second display area, and the at least part of the document is displayed as rendered in the second display area. Editing data is received and is processed, thereby editing the at least part of the document displayed in the second display area, and the editing is applied to the at least part of the document displayed in the first display area.

29 Claims, 8 Drawing Sheets

(56) References Cited

U.S. PATENT DOCUMENTS

| | | | |
|---|---|---|---|
| 7,360,202 B1* | 4/2008 | Seshadri et al. | 717/106 |
| 7,559,024 B2* | 7/2009 | Mori et al. | 715/273 |
| 7,640,505 B1* | 12/2009 | Edmunds | 715/744 |
| 7,707,191 B2* | 4/2010 | Arkhipov et al. | 707/684 |
| 7,793,219 B1* | 9/2010 | Stratton et al. | 715/723 |
| 7,971,194 B1* | 6/2011 | Gilboa | 717/136 |
| 7,979,804 B1* | 7/2011 | Schang | 715/763 |
| 8,434,014 B1* | 4/2013 | Jaramillo | 715/763 |
| 2004/0019849 A1 | 1/2004 | Weng et al. | |
| 2005/0039108 A1 | 2/2005 | Hudson | |
| 2005/0223336 A1 | 10/2005 | Plow et al. | |
| 2005/0240869 A1 | 10/2005 | Leetaru et al. | |
| 2006/0155705 A1* | 7/2006 | Kamper et al. | 707/8 |
| 2006/0248442 A1 | 11/2006 | Rosenstein et al. | |
| 2008/0120538 A1* | 5/2008 | Kurz et al. | 715/255 |
| 2008/0155397 A1 | 6/2008 | Bissonnette et al. | |
| 2008/0178122 A1* | 7/2008 | Besecker | 715/854 |
| 2008/0244740 A1* | 10/2008 | Hicks et al. | 726/22 |
| 2008/0301228 A1* | 12/2008 | Flavin | 709/204 |
| 2009/0063953 A1* | 3/2009 | Kraus et al. | 715/234 |
| 2014/0304682 A1* | 10/2014 | Taylor et al. | 717/113 |

FOREIGN PATENT DOCUMENTS

| | | |
|---|---|---|
| JP | 63049882 A | 3/1988 |
| JP | 2004139142 A | 5/2004 |
| WO | 0057314 A2 | 9/2000 |
| WO | 03003642 A2 | 1/2003 |
| WO | 2004068290 A2 | 8/2004 |
| WO | 2005033827 A2 | 4/2005 |

OTHER PUBLICATIONS

Microsoft Office Open XML Formats, Preview for Developers; Jun. 2005; Micorosft Corp.; pp. 1-30.*

Helen Bradley; MS Office Tips, Tricks, and Tutorials; Mar. 28, 2007; pp. 1-7.*

Mendelson, Edward, "Smoother Site Buidling with FrontPage 2003," PC Magazine, Sep. 27, 2010, pp. 1.

Braun, Herbert, "Web Design Battleships, Microsoft's FrontPage successor shakes up Dreamweaver & Co.," Prufstand—Webeditoren; pp. 176-181; 2006.

WordPress.Org, "Live Comment Preview," Accessed on: Aug. 8, 2014; http://wordpress.org/extend/plugins/live-comment-preview/ (3 pages).

"Stylizer—Real-time CSS editing saves you time and money," Accessed on: Aug. 8, 2014; http://www.skybound.ca/stylizer/ (5 pages).

"MindTouch Deki Standard," Accessed on: Aug. 11, 2014 via web archive dated: Mar. 5, 2009; http://web.archive.org/web/20090305142504/http:/www.mindtouch.com/Products/MindTouch_Deki_Standard (1 page).

* cited by examiner

DOCUMENT EDITING METHOD

BACKGROUND OF THE INVENTION

The present invention relates to a method of editing a document, particularly a method of editing a webpage.

Methods of editing an electronic document, such as a webpage, are known. For a webpage, one known editing method involves editing of code which is used to render a webpage. The code may include mark-up language code, such as Hyper Text Mark-up Language (HTML). Once the code has been edited, the webpage rendered by the edited code is previewed. Editing requires careful attention to edit the code correctly. To preview the edited webpage, it may be necessary to submit the edited code to a server for publishing the edited webpage; this can be time-consuming and onerous for repeated edits.

Another method of editing a webpage uses editing software with so called "what you see is what you get" (WYSIWYG) functionality. DREAMWEAVER® software and MICROSOFT® FRONTPAGE® software are examples of such software. WYSIWYG functionality allows an editor to edit a marked-up version of the webpage rendered by the code. Such mark-up may include markings showing the editor positioning and layout of text boxes, frames, formatting parameters, for example, to aid the editor in editing. By showing this mark-up, the editor does not see a true representation of the webpage rendered from the code. Moreover, the mark-up can interfere with the positioning of elements of the webpage, again providing an inaccurate representation of the webpage. Further, by editing the webpage rather than the code, WYSIWYG editors can generate excess and unnecessary code for rendering the webpage as edited.

Other methods of editing a webpage are known. For example, for a so called "database driven" webpage, the contents of portions of the webpage are stored separately in a database. When the webpage is published, the separate portions are combined to form the webpage. A portion can be edited, and then submitted to the server to update the webpage content. For the example of editing a section of text within a document, an editor would edit the text without viewing any other content surrounding the text; i.e. the editor cannot see the text being edited in situ. Once editing is complete, the edited text is submitted and replaces the text previously in the same specific area of the document.

In another method, an editor can select a portion of a webpage for editing, within a webpage browser application, which prompts editing mark-up to be shown for the selected portion. The mark-up may include line breaks, paragraph changes, headings and/or any other code for rendering the web page. Once the portion is edited, the portion is de-selected, thus removing the mark-up and previewing the edited portion.

It is an object of the present invention to provide an improved document editing method.

SUMMARY OF THE INVENTION

In accordance with one aspect of the present invention, there is provided a method of editing a document, the method including:

a) receiving data associated with a document, the data including mark-up language data;

b) processing the received data to render at least part of the document for display in a first display area, and displaying as rendered the at least part of the document in the first display area;

c) processing the received data to render the at least part of the document for display in a second display area, and displaying as rendered the at least part of the document in the second display area;

d) receiving editing data; and e) processing the editing data, thereby editing the at least part of the document displayed in the second display area, and applying said editing to the at least part of the document displayed in the first display area.

Processing the editing data so as to display editing of at least part of the document in the first display area and in the second display area is advantageous. By editing the document itself, and not for example code for rendering the document, the editor does not require specialist knowledge of code associated with the document. This is advantageous, especially for editing complex documents such as a webpage which include multiple types of document content, and which therefore are associated with code which is complex to edit. Thus the present invention provides a simple, versatile and intuitive method for editing a document.

In embodiments of the present invention, the method includes displaying the first display area and the second display area so as to be viewable simultaneously. An editor can therefore edit part of the document in the second display area, and view the edited part of document in the first display area at the same time, without having to switch between different areas for editing the document and for viewing the edited document.

In further embodiments of the present invention, the method includes in step e) displaying the editing in the first display area during said editing. The editing may therefore be seen whilst the document is being edited. Therefore, the editor can see if an edit changes the document in the second display area detrimentally, for example by disrupting a layout of the document. He can then modify the edit, or edit the document further, to obtain the desired layout. In comparison, in exemplary prior art systems, the editing is made and then consequently previewed; this can be time consuming and iterative if the layout of the edited document needs further editing after previewing to obtain the desired layout.

In a special embodiment of the present invention, the method includes in step e) displaying the editing in the first display area substantially simultaneously as making the editing in the second display area. In this way, the editing is previewed in the first display area as the editing is made in the second display area; i.e. when an edit is made, the same edit is displayed being made in the first display area at substantially the same time as the edit is made. The terms "substantially simultaneously" and "substantially the same time" should be taken to mean that the editing in the second display area and the displaying of the editing in the first display area may not occur simultaneously; there may be a delay between the editing in the second display area and the displaying in the first display area, this delay being imperceptible to a human.

In other embodiments of the present invention, the method includes displaying the at least part of the document in the first display area without editing mark-up. Such editing mark-up may include those mark-up examples described previously, for example markings for showing the positioning of a layout of text boxes, frames, formatting parameters, and/or a cursor for marking a position of editing text. Without any such mark-up, the edited document displayed in the first display area may be shown as a true representation of the document. This aids an editor to make accurate edits simply and efficiently, compared with prior art methods where an editor would need to preview the edited document without mark-up after having made edits; if the previewed document is not satisfactory, the editor may need iteratively to re-edit the document using mark-up and then preview the re-edited document again, until the desired edited document is obtained.

The method of the present invention includes displaying the edited at least part of the document in the first display area as the edited at least part of the document would be displayed by a document viewing application. Such embodiments have the advantages of those embodiments described above which display the edited document in the first display area without editing mark-up. Further, by displaying the edited at least part of the document in the first display area as would be displayed by a document viewing application, the editor can easily edit the document so as to have a desired layout and content. For a document, such as a webpage, which is publicly available and accessed by numerous viewers, this is especially an advantage since it allows the editor to ensure that the edited document has a desired content and layout for public viewers to see. In an embodiment, the method may include selecting one of several different document viewing applications, and displaying the edited document in the first display area in accordance with the selected viewing application. By previewing the edited document for one or multiple selected viewing applications, the editor can ensure that the edited document has a desired content and layout for the one or multiple viewing applications. This ensures that regardless of the application used to view the edited document, the layout and content is acceptably presented.

In embodiments of the present invention, the method includes transmitting data associated with the edited at least part of the document to apparatus for serving the document. In this way, once the document has been edited, data representative of the edited document may be transferred to, and stored by, the serving apparatus. For the example where the document is a webpage, the apparatus may be a webpage hosting server, which provides access of the edited webpage to internet users.

In some embodiments of the present invention, the method includes providing the second display area in response to a user input. In this way, the second display area may be generated upon demand, for example when an editor identifies and selects a part of the document displayed in the first display area for editing. It is envisaged in further embodiments that when editing of the identified part is complete, the second display area may be closed.

In further embodiments of the present invention, the method includes selecting at least part of the document for editing and displaying the selected at least part of the document in the second display area. An editor may therefore navigate to a part of the document in the first display area, and simply select this part for editing.

In other embodiments, the method includes hiding the second display area. The second display area may therefore be hidden from view, for example to allow for enlarging the first display area so as to display more of the document therein. In other embodiments, it is envisaged that part of the second display area may be hidden. Further, the method may include revealing the second display area after being hidden. For example, the second display area may be hidden to review the document in the first display area until a part of the document is identified for editing. The second display area may then be revealed, to allow for editing of the identified document part.

In other embodiments of the present invention, the method includes moving the second display area with respect to the first display area. In this way, the first and second display areas may be arranged by an editor to have a desired positioning, for example to aid editing of the document.

In particular embodiments, the method includes overlapping the first display area and the second display area. In further embodiments, the method includes overlapping content of the document displayed in the second display area with content of the document displayed in the first display area. Such overlapping may involve re-sizing and/or moving one or both of the first and second display areas. Overlapping the first and second display areas, and in some embodiments document content, may aid an editor when editing the document, for example to allow easy comparison of a part of the document displayed in the first display area with a part of the document displayed in the second display area.

In embodiments of the present invention, the method includes arranging the content of the at least part of the document displayed in the second display area and/or the content of the at least part of the document displayed in the first display area to be coincident with each other. This may involve re-sizing and/or moving the content in the first and/or the second display area so that the contents of one of the first and second display areas is superimposed on the contents of the other of the first and second display areas. In such embodiments, the upper one of the overlapped first and second display areas may be completely transparent, so that only the lower of the first and second display areas is visible. Alternatively, the upper one may be partially transparent, so that both the first and second display areas are viewable simultaneously; in this way, any editing mark-up indicated in the second display area is visible, to aid the editor editing the document, whilst showing the editing of the document in the lower display area. With the contents of the first and second display areas being overlapped and coincident, the editing in the second display area and the displaying of the editing in the first display area appears to a viewer to be combined, so as to be indistinguishable from each other. It may therefore appear to a viewer that editing of the document in the second display area and displaying of the editing in the first display area is occurring in one display area. Such embodiments allow an editor to edit the document simply and intuitively. With the content of the first and second display areas being coincident, both first and second display areas may occupy a maximum available display area, for example of a screen, thus allowing an editor to edit the document more easily, and to view simultaneously more of the document being edited. In further embodiments, the first and/or second display areas may be re-positioned after having being overlapped with the contents being coincident. In this way, embodiments of the present invention provide highly versatile methods of editing a document.

In yet further embodiments of the present invention, the method includes: f) storing data associated with the at least part of the document edited in step e) as a first edited version. Thus, a record may be kept of the edits made to an original document associated with the data received in a) to generate the first edited version. The editing of the document to generate the first edited version may be made by one editor, or alternatively by more than one editor.

In some embodiments, the method includes selecting and displaying in the first display area the first edited version. An editor may therefore view the first edited version on demand.

In other embodiments, the method includes annotating said at least part of the document, and storing data associated with said annotating as part of the first edited version. Such annotating includes making annotations to the at least part of the document being edited. These annotations are different from the editing mark-up referred to previously. The annotating may include making notes on the document, for example by adding a text box including text of the note, to the document being edited. Such annotations may be for use of an editor when editing the document, for example to remind him of details concerning the editing. The annotations may also be used for one editor to leave a note to a further editor concerning editing of the document. For example, a junior editor may review and edit the document. Then, a senior editor may review and edit if necessary the document as edited by the junior editor, to finalise the edited version. The junior editor may add annotations to the edited document, for the attention of the senior editor when reviewing the edited document.

In further embodiments of the invention, the method includes:

g) receiving further editing data;

h) processing the further editing data, thereby further editing the at least part of the document displayed in the second display area and applying the further editing to the edited at least part of the document displayed in the first display area; and i) storing as a second edited version data associated with the further edited at least part of the document.

To generate the second edited version, the original document may be edited differently from the editing made to generate the first edited version. Alternatively, the first edited version may be edited further to generate the second edited version. In either case, storing the second edited version data keeps a record of the edits made to generate the second edited version.

In yet further embodiments of the present invention, the method includes selecting and displaying in the first display area at least part of the first edited version and/or the second edited version. An editor may therefore view the first and/or second edited versions on demand.

In other embodiments, the method includes annotating said at least part of the document, and storing data associated with said annotating as part of the first edited version and/or the second edited version. Such annotations are similar to those described previously for the first edited version, and are therefore similarly advantageous.

In embodiments of the invention, the method includes comparing one of the document associated with the data received in step a), the first edited version and the second edited version with a different one of the document associated with the data received in step a), the first edited version and the second edited version; and indicating at least one difference between said compared one and said different one document. Such embodiments are advantageous by allowing different editing made to the document to be contrasted. For example, a junior editor may edit the document to generate the first edited version. A senior editor, reviewing the first edited version, may therefore compare the edits of the first edited version with the original document, to identify the edits made by the junior editor. In another example, a first editor may edit the document to generate the first edited version, and a second editor may edit the document to generate the second edited version. A third editor may compare the edits made by the first and/or the second editors with the original document.

In some embodiments, the method of the invention includes preventing the second editor from editing at least part of the document during editing of the document by the first editor. Such embodiments may be used if more than one editor edits the document to generate the first and/or the second edited version. Preventing the second editor from editing, whilst the first editor edits, stops the second editor from changing edits that a first editor may be in the process of making. Once the first editor has completed editing, the second editor is then permitted to edit the document. In further embodiments the method includes notifying the second editor that at least part of the document is being edited by the first editor. Thus, the second editor knows to wait until the first editor has finished editing. Alternatively, the first editor may generate the first edited version, and the second editor may generate the second edited version. The method may further include notifying the second editor when the first editor has finished editing, and that the document is available for editing.

The method of the invention may include in step e) editing content of the at least part of the document, the content including text, an image, a graphic element, a hyperlink, a form, a table, an inline frame including for example at least part of a webpage, a sound element, a video element and/or an animation element. Thus, the method provides a versatile and powerful method of editing various types of document, and documents including various types of content.

In yet further embodiments of the invention, the method includes accessing a further document using the first display area. Thus, the method provides for navigating to different documents, for example web pages, in which case the first display area may have webpage browsing capabilities.

In embodiments of the invention, the method includes: receiving data associated with the further document; processing the data associated with the further document to render at least part of the further document for display in the second display area and in the first display area, and displaying as rendered the at least part of the further document in the second display area and in the first display area; receiving further editing data for editing the at least part of the further document; processing the further editing data, thereby editing the at least part of the further document in the second display area and applying the editing of the at least part of the further document to the at least further part of the document displayed in the first display area. In this way, further documents may easily be edited in accordance with the method of the present invention. For example, if the document is a webpage, a website comprising numerous web pages may be enabled for editing using the method of the invention. Thus, an editor can navigate the website by browsing to different web pages via the first display area, and edit web pages as desired.

In a further aspect of the present invention, there is provided a method of processing data associated with a document, the method including receiving data associated with the document; processing said data and generating modified data including data for providing editing of the document in accordance with the method of the present invention. Such a method allows a document to be enabled for editing using the method of the present invention. For example, if the document is a webpage, code representative of the webpage may be processed to add functionality for editing the webpage using the method of the present invention. Thus, a webpage viewer, having editing permissions, may access the enabled webpage and edit the webpage in accordance with the present invention, using the added functionality. Further details are explained below.

In accordance with a further aspect of the present invention, there is provided a method of editing a document, the method including:

a) receiving data associated with a document, the data including mark-up language data;

b) processing the data to render at least part of the document for display in a display area, and displaying as rendered the at least part of the document in the display area;

c) receiving editing data; and d) processing the editing data, thereby editing the at least part of the document displayed in the display area. Such an embodiment permits an editor to edit the document in a single display area, allowing editing to be performed in a maximum available display area.

In further embodiments of the invention, the method includes displaying during editing the at least part of the document in the display area without editing mark-up. Thus an editor may simply edit the document without editing mark-up affecting the layout of the document being edited. A true representation of the document being edited may therefore be displayed. In other embodiments, no editing mark-up may be indicated, except for a marker such as a cursor for indicating a position of editing the displayed document.

In embodiments of the present invention, the document may be a webpage. Moreover, for such embodiments, an application for viewing and/or editing the document may be a webpage browser application.

According to further aspects of the present invention, there is provided apparatus arranged to perform a method according to the present invention, and a computer program product having a computer-readable medium storing computer instructions that can cause a computerized device to perform a method according to the present invention.

Further features and advantages of the invention will become apparent from the following description of embodiments of the invention, given by way of example only, which is made with reference to the accompanying drawings.

DETAILED DESCRIPTION OF THE INVENTION

The present invention relates to a method of editing a document, namely an electronic document provided using a mark-up language. Embodiments of the invention will be described where the document is a webpage. A webpage is a document which may be viewed via the Internet, otherwise known as the World Wide Web. Further embodiments are envisaged where the document may be a document other than a webpage, for example any document provided using a mark-up language.

A mark-up language in accordance with the present invention is a language used to define how content of a document should be handled by a document handling application. For example, the mark-up language may define how to render document content data in order to display a document, using a document viewing application, with a desired layout and formatting of the document content. Rendering includes interpreting data associated with the document to provide a representation of the document; for example, to provide an image of the document for displaying using a display device. The mark-up language may be referred to as a code, and may include tags as the mark-up. The mark-up language of the present invention may be a mark-up language according to the Standard Generalised Markup Language (SGML) and/or the Generalised Markup Language (GML). For embodiments where the document is a webpage, the data may include Hyper Text Mark-up Language (HTML) code data, which is an example of a SGML. In other embodiments, the mark-up language data may also, or alternatively, include any one of eXtensible Markup Language (XML), and/or Extensible Hyper Text Markup Language (XHTML), and/or Extensible Application Markup Language (XAML) data. It is envisaged that the mark-up language of the invention may be any version, whether past, present or future, of the mark-up language types described herein, and that the method of the invention may be applied to any such version. For example, the present HTML version is HTML 4, and HTML 5 has now been announced; the present invention may be applied to HTML versions 1, 2, 3, 4 and/or 5. Further, for XHTML, version 2 is anticipated, and the present invention may be applied to XHTML version 2.

Figure 1:
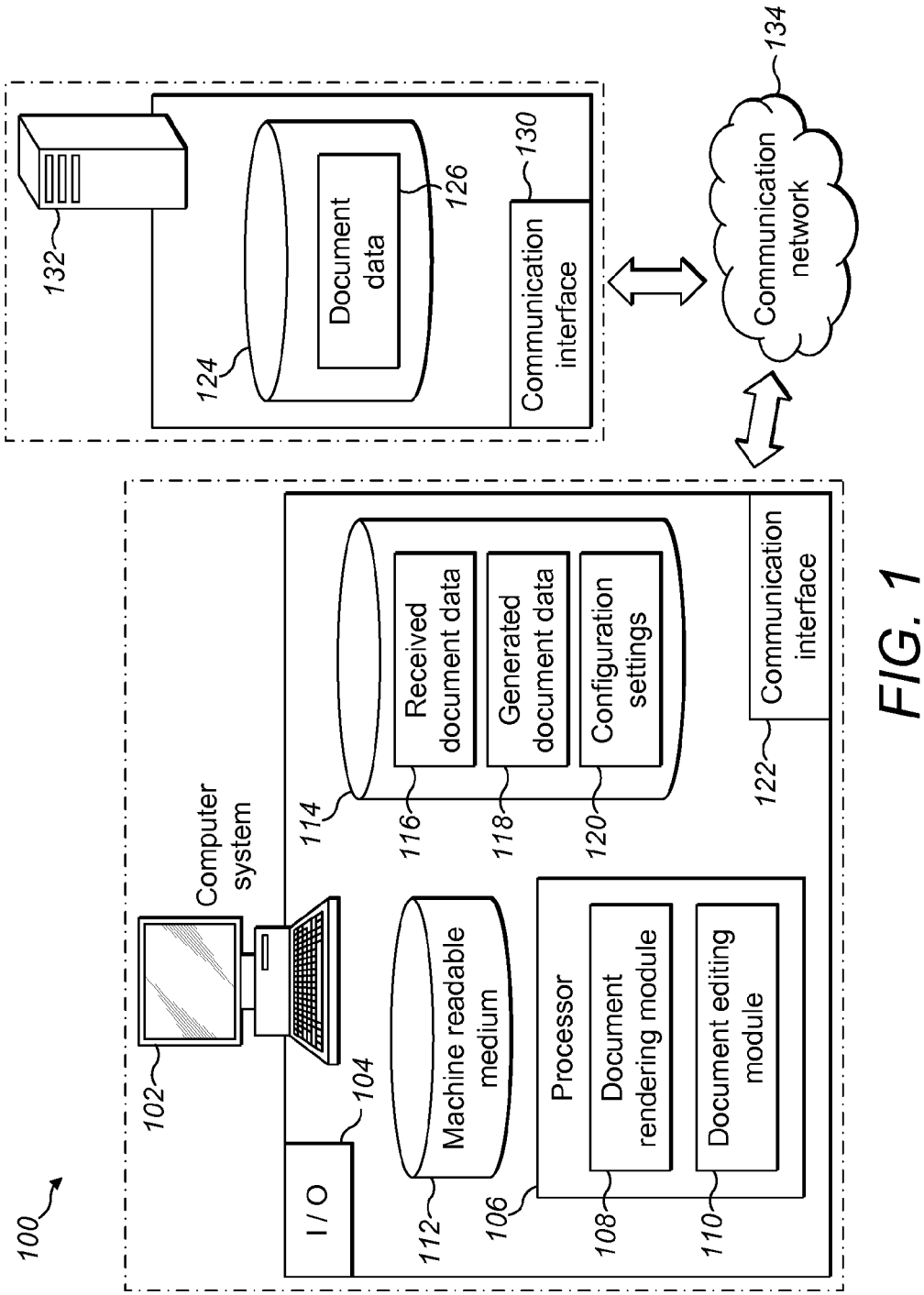
FIG. 1 shows an example system for providing a method of the present invention.

FIG. 1 shows an example system 100 for providing a method in accordance with embodiments of the present invention.

System 100 includes a computer system 102 and a remote server 132, which may be a webpage hosting server. In an embodiment of the invention, the computer system 102 includes a plurality of functional components. The functional components may be consolidated into one device or distributed among a plurality of devices. The system 100 includes a processor 106. The computer system 102 includes a machine-readable medium 112, e.g. a main memory, a hard disk drive, or the like, which carries thereon a set of instructions to direct the operation of the computer system 102 or the processor 106, for example in the form of a computer program. The processor 106 may comprise one or more microprocessors, controllers, or any other suitable computer device, resource, hardware, software, or embedded logic. Furthermore, the software may be in the form of code embodying a web browser application.

The computer system 102 further includes a communication interface 122 for electronic communication with a communication network 134. In addition, a remote server system 132 is also provided, comprising a communication interface 130, operable to communicate with the communication interface 122 of the computer system 102 through a communication network 134. In FIG. 1, the computer system 102 operates in the capacity of a client machine and can communicate with a remote server 132 via communication network 134. Each of the communication interfaces 122, 130 may be in the form of a network card, modem, or the like.

In addition, the computer system 102 also comprises a database 114 or other suitable storage medium operable to store data used in providing the method of the invention, for example received data 116 associated with a document, and/or data 118 generated during editing of a document. The database 114 may also include a configuration settings store 120 for configuring how the method of the invention is implemented on the computer system 102. These configuration settings are operable to be implemented on computer system 102.

The server 132 includes a storage device 124 in which data 126 associated with a document is stored. The storage device 124 may, for example, be a database or other suitable storage medium located within or remotely to the server 132.

Computer system 102 further includes a user input/output interface 104 including a display (e.g. a computer screen) and an input device (e.g. a mouse or keyboard). The user interface 104 is operable to display various data such as source segments and outputted target text sub-segments, and also to receive data inputs from a translation system operator.

Figure 2:
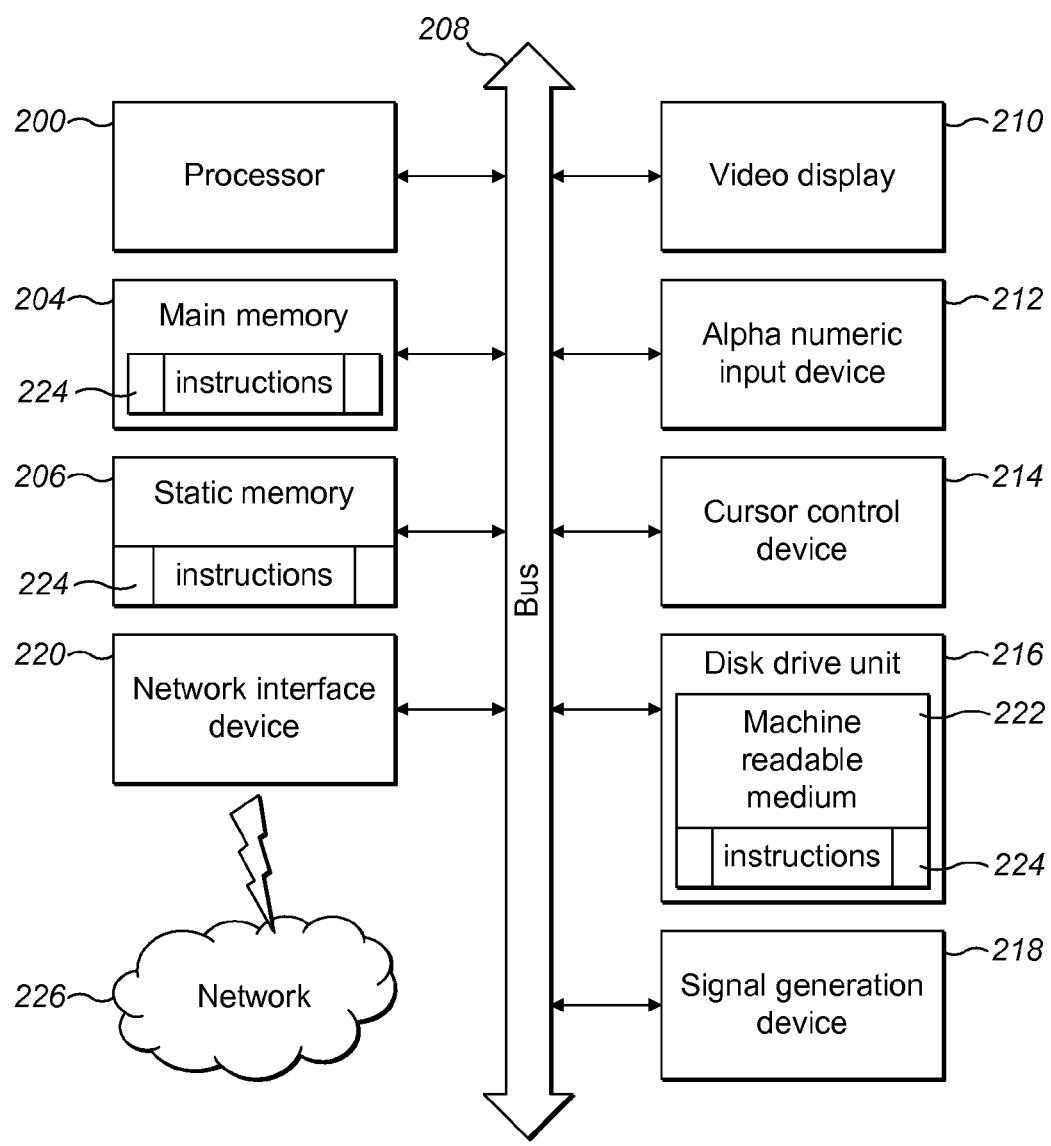
FIG. 2 shows schematically a computer system for providing the method of the present invention.

In FIG. 2, a diagrammatic representation is shown of the computer system 102 within which a set of instructions, for causing the computer system 102 to perform any one or more of the methodologies discussed herein, may be executed. In alternative embodiments, the computer system 102 operates as a standalone device or may be connected (e.g., networked) to other computer systems or machines. In a networked deployment, the computer system 102 may operate in the capacity of a server or a client machine in a server-client network environment, or as a peer machine in a peer-to-peer (or distributed) network environment. The computer system 102 may comprise a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "computer system" shall also be taken to include any collection of machines or computers that individually or jointly execute a set of (or multiple set of) instructions to perform any one or more of the methodologies discussed herein.

The computer system 102 may include a processor 202 (e.g. a central processing unit (CPU), a graphics processing unit (GPU) or both), a main memory 204 and a static memory 206, which communicate with each other via a bus 208. The computer system 102 may further include a video display unit 210 e.g. a liquid crystal display (LCD) or a cathode ray tube (CRT)). The computer system 102 may also include an alphanumeric input device 212 (e.g. a keyboard), a user interface (UI) navigation device 214 (e.g. a mouse), a disk drive unit 216, a signal generation device 218 (e.g. a speaker) and a network interface device 220.

The disk drive unit 216 may include a machine-readable medium 222 on which is stored one or more sets of instructions and/or data structures (e.g. software 224) embodying or utilised by any one or more of the methodologies or functions described herein. The software 224 may also reside, completely or at least partially, within the main memory 204 and/or within the processor 202 during execution thereof by the computer system 102, where the main memory 204 and the processor 202 may also constitute machine-readable media.

The software 224 may further be transmitted or received over a network 226 via a network interface device 220 utilising any one of a number of well-known transfer protocols, e.g. the HyperText Transfer Protocol (HTTP).

Figure 3:
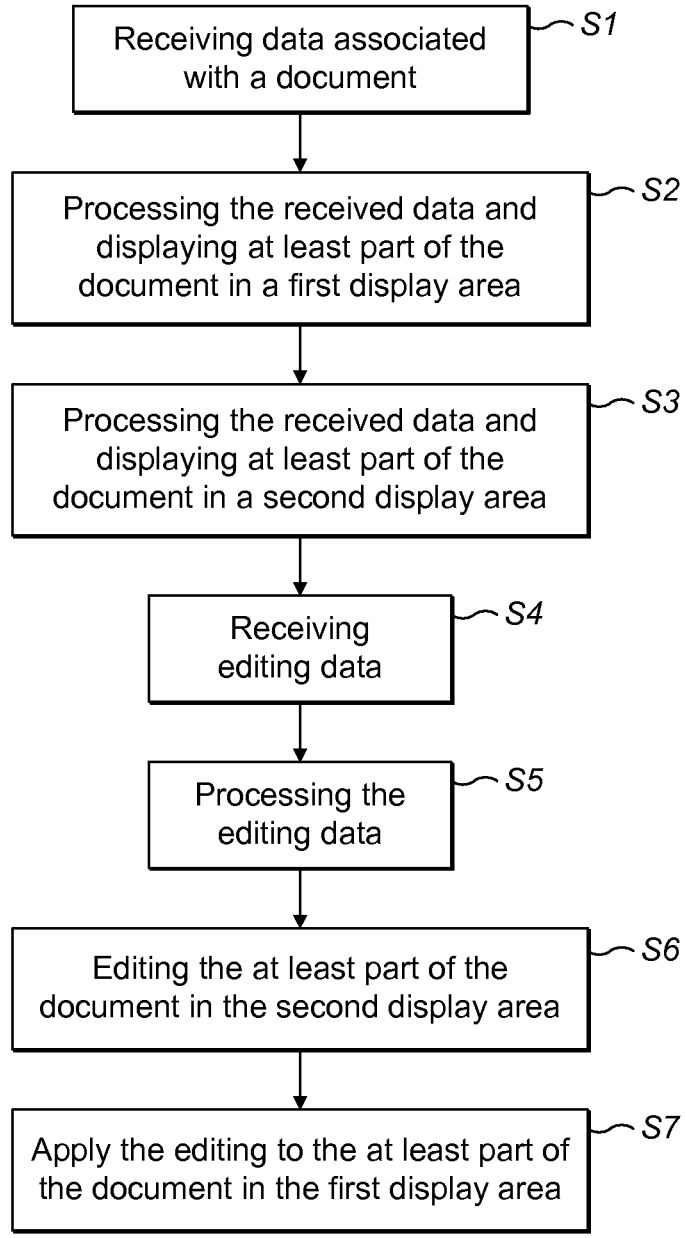
FIG. 3 shows a flow diagram of an overview of a method of the invention.

FIG. 3 shows a flow diagram of an overview of a method according to the present invention. In step S1, data associated with a document is received. For example, the computer system 102 may receive such data from the server 132. For the example where the document is a webpage, the server 132 may be a website hosting server, which stores data associated with a website and transmits, over the Internet network, such data to the computer system 102 when the computer system 102 requests to access the website. This request may be initiated by a user. The data associated with the document may be received from multiple sources, such as different computer systems connected via a network such as the Internet, and the data compiled by the computer system 102 to obtain data representative of the document. A document viewing application may be a webpage browser application, in the case that the document is a webpage.

The received data associated with a document includes mark-up language data, as explained above. The data may also include non-mark-up language data, for example JAVASCRIPT® data, and/or FLASH® data, and/or Cascading Style Sheet (CSS) data.

Further, the received data may include data arranged to provide the method of the present invention, for example HTML and/or JAVASCRIPT® data arranged to provide the method of the invention when processed by a webpage browser application.

In step S2, the received data is processed by for example the processor 106. The received data is processed to render at least part of the document for display in a first display area. The rendered at least part of the document is then displayed in the first display area; further details are explained later.

In step S3, the received data is processed by for example the processor 106. This processing renders the at least part of the document for display in a second display area. The rendered at least part of the document is then displayed in the second display area; further details are explained later.

In step S4, editing data is received, for example by the computer system. Such editing data may be received via the alpha numeric input device 212 and/or the cursor control device 214 by a user inputting the editing data. The editing data is representative of edits for editing the document.

In step S5, the editing data is processed by for example the processor 106. As a consequence of the processing in step S5, the editing represented by the editing data is applied to the at least part of the document displayed in the second display area, thus editing the document in step S6 in accordance with the editing data.

In step S7, the editing made to the document in step S6 is applied to the document displayed in the first display area. This applying of the editing may include replicating the editing made in step S6 in the document displayed in the first display area.

Processing of data in the present invention, such as the processing in steps S3, S5 and S6 may be under the control of the instructions 224 being for example computer software.

Figure 4:
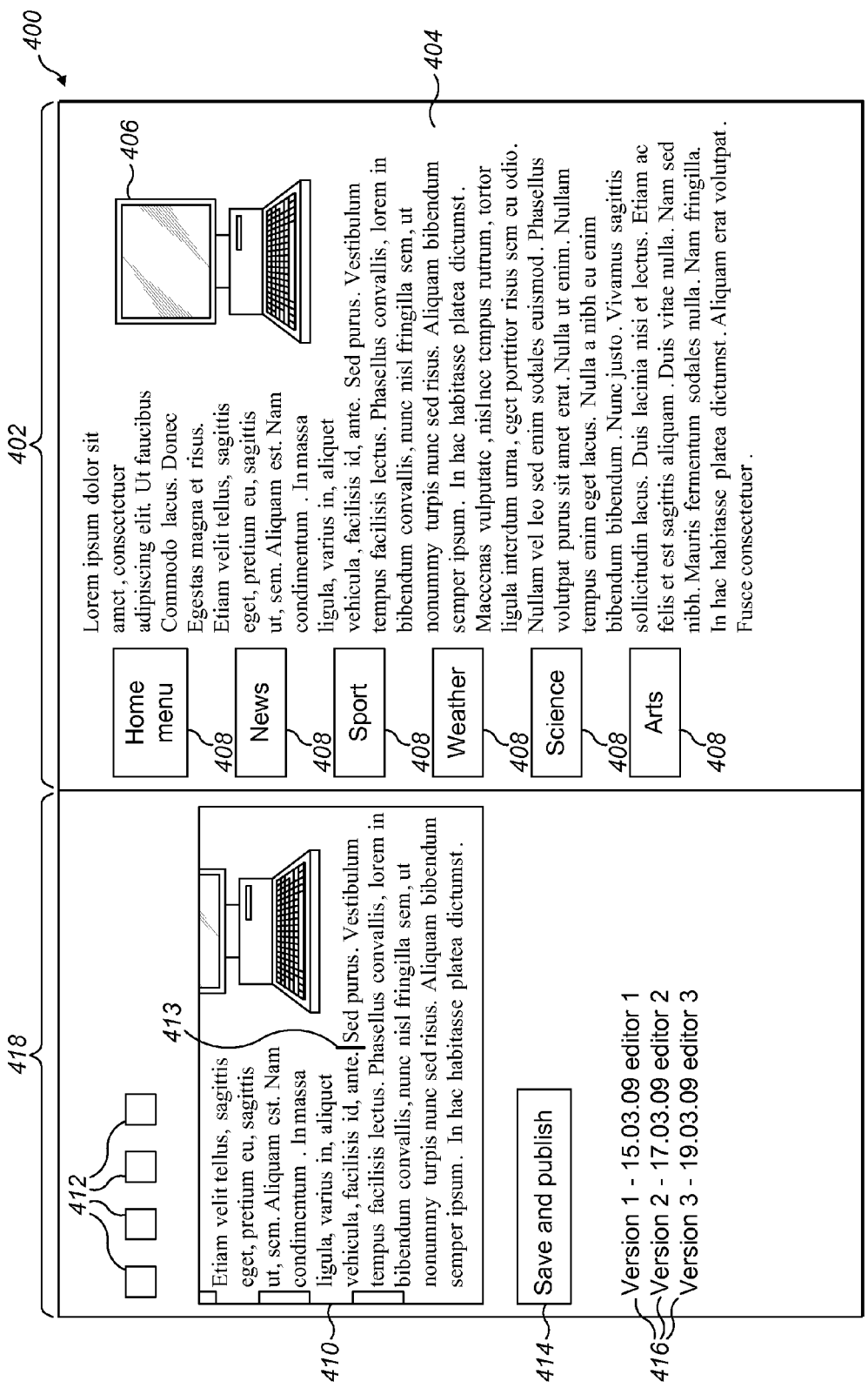
FIG. 4 shows schematically an interface in accordance with an embodiment of the invention.

FIG. 4 shows schematically an example interface 400 in accordance with an embodiment of the invention. The interface may for example be displayed on the computer screen of the computer system 102. In this embodiment, the document is a webpage. The interface may be provided by software such as a webpage browsing application, for example the MICROSOFT® INTERNET EXPLORER® browsing application or the MOZILLA® FIREFOX® browsing application. A webpage browsing application is an application which allows a user to access and view a webpage, and to interact with the webpage, for example to submit data to a server or to navigate to a further webpage.

A webpage browser application processes data associated with a webpage, and for example representative of a webpage, to render a webpage. For example, the data may include mark-up language data, such as HTML, and also webpage content data. In accordance with the definition of a mark-up language above, the mark-up language codes for how webpage content, represented by the webpage content data, is arranged by a webpage browser application to present a webpage to the user. The webpage content may include text, an image, a graphic element, a hyperlink, a form, a table, an inline frame, a sound element, a video element and/or an animation element. For example, the webpage content data may include the text "THIS IS A TEST". The mark-up language data, in this example being HTML, would determine how the "THIS IS A TEST" text is displayed. For example, by using the HTML tags <b> and </b> to surround the "THIS IS A TEST" text, i.e. <b>THIS IS A TEST</b>, the data provides for a webpage browser application to render the "THIS IS A TEST" text in bold style in a webpage. Numerous other examples are envisaged, using alternative mark-up language parameters, for example any tag defined in accordance with the HTML or XHTML language, and alternative webpage content data such as an image or a link to webpage.

In this embodiment, the webpage browser application receives data associated with the webpage, in accordance with step S1, and processes this data so as to generate the first display area 402, and to render and display at least part of the webpage represented by the received data in the first display area 402, in accordance with step S2. In the example illustrated in FIG. 4, the webpage displayed in the first display area includes text 404, an image 406, and graphic elements 408 for a user to navigate to different parts of a website, for example a home menu webpage, a news webpage, a sport webpage, a weather webpage, a science webpage or an arts webpage. In this example, the webpage may be part of a news website, and the text and image displayed in the first display area 402 may constitute a news article.

In accordance with step S3, the received data is processed by the webpage browser application so as to generate the second display area 410 and to render and display in the second display area 410 at least part of the same webpage displayed in the first display area 402. In this embodiment, the webpage browser application generates the first and second display areas 402, 410 so as to be viewable simultaneously. The first and the second display areas may be referred to as frames or windows within the webpage browser application, or any other software for providing the method of the invention. Alternatively, for a computer system with two or more computer screens, the first and second display areas may each be displayed on a different screen. The rendering of at least part of the webpage in the first and second display areas may be handled by a document rendering module 108 of the processor 106 of FIG. 1.

As will be explained further below, a user may edit the webpage. For this purpose, the method of the invention may include providing tools to assist with the editing. Accordingly, when the webpage browser application processes the data, it generates the editing tools in the interface, for example buttons with predetermined editing functionality, which a user interacts with to edit the webpage. Such editing tools may include buttons 412 for editing text properties, such as a font, style, and/or size. A cursor 413 may also be provided to assist a user in selecting a position in text of the webpage to edit the webpage. A button 414 may also be provided to allow a user to save data associated with an edited webpage to a webpage hosting server, thereby making the edited webpage available to the public and thus publishing the edited webpage.

Further, as will be explained below, different versions of the edited webpage may be created, and at least one version saved. When a version of the edited webpage is saved, the data associated with the webpage data may be modified so that the webpage browser application provides a link 416 for a user to select if he wishes to view a particular version of the webpage.

In this way, the present invention may provide a webpage editing console 418 including the second display area 410 and editing tools 412, 413, 414, 416 such as those illustrated in FIG. 4, for editing a webpage.

Figure 5:
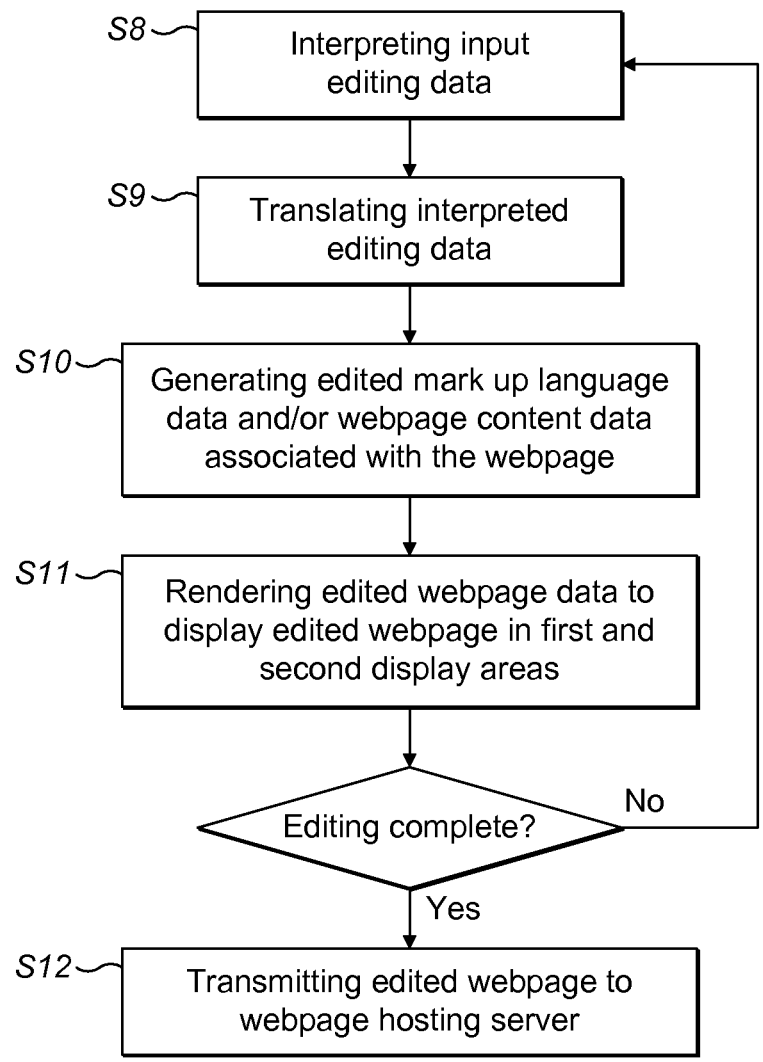
FIG. 5 shows a flow diagram of processing editing data according to an embodiment of the invention.

Editing of the webpage will now be described according to an embodiment of the present invention. The editing of the webpage data may be handled by a document editing module 110 of the processor 106 of FIG. 1. FIG. 5 is a flow diagram showing steps of the processing of the editing data in step S5 of FIG. 3. In step S8, the received editing data in step S4 is interpreted so as to translate in step S9 the editing data into a data language understandable by the webpage browser application. In this way, the mark-up language data and/or webpage content data associated with the webpage is edited with mark-up language data and/or webpage content data generated in step S10 from the translation. The received data associated with the webpage may include an algorithm for interpreting and translating the input editing data in accordance with steps S8 and S9. The algorithm may be coded in the JAVASCRIPT® language, and/or the FLASH® language. Further, or alternatively, the algorithm may be provided as part of a webpage browser application, and may be provided using JAVA® code and/or MICROSOFT® SILVERLIGHT® code. The translation and generation of edited data associated with the webpage may be handled by a webpage data generator. This may be a functionality incorporated in the webpage browser application, for example an HTML generator. The algorithm translates the input editing data to provide the webpage data generator with instructions on the precise mark-up language data and/or webpage content data to generate. In embodiments of the invention, the method includes controlling the generation of the mark-up language data and/or webpage content data using a set of data generation rules. This control may be provided by a JAVASCRIPT® algorithm, or an algorithm written using another appropriate code such as those listed above, which is included in the received webpage data, and ensures the data is generated according to a desired format, for example in accordance with an industry standard format. In the case of generating HTML, the industry standard format may be the World Wide Web Consortium (W3C). Further, the input editing data may be translated into CSS code by an appropriate algorithm, thus editing the webpage data for rendering the webpage with a desired presentation. It is envisaged in yet further embodiments that the input editing data may be translated into FLASH® code and/or JAVASCRIPT® code to edit a FLASH® element and/or a JAVASCRIPT® element of the webpage.

In further embodiments, the algorithm may be adapted to translate input editing data in one national language to a different national language for editing the webpage. For example, a user may edit a webpage by inputting editing data in the French language, and the algorithm will translate the editing data so that the editing of the webpage is conducted in the English language. Implementing such a translation may involve communication of the webpage browser application with the server to query a database of the English and French languages, in order to provide the translation. This communication may be conducted by AJAX, for example. Alternatively, the English and French language database may be stored on the computer system, for example on the machine readable medium 114. For such translations conducted in different languages, the database would include the appropriate language data. In further embodiments, a user may be able to select and change a language for displaying the webpage displayed in the first and/or second display areas 402, 410.

In step S11 the edited webpage data is then rendered by the webpage browser application so that the edited part of the webpage is displayed in the first and the second display areas 402, 410. The user thus can see the edits he makes to the webpage. If further editing of the webpage is desired, then steps S8 to S11 may be repeated until editing is complete.

The data associated with the edited webpage may be stored by the computer system during displaying of the webpage in the first and second display areas, and during editing. Once editing is complete, the user may wish to update the data associated with the webpage stored on apparatus for serving the webpage, for example the webpage hosting server. To do this, he may transmit in step S12 the edited data associated with the webpage to the webpage hosting server, to update the webpage data stored thereon and make the edited webpage publicly available. The data transmitted may be a full set of data representing the edited webpage, which replaces the data associated with the original webpage stored on the webpage hosting server. Alternatively, only data representative of edited parts of the webpage may be transmitted, which replaces selected parts of webpage data stored on the server representing the edited webpage parts. The user may transmit the edited data using the button 414 illustrated in FIG. 4.

Figure 6:
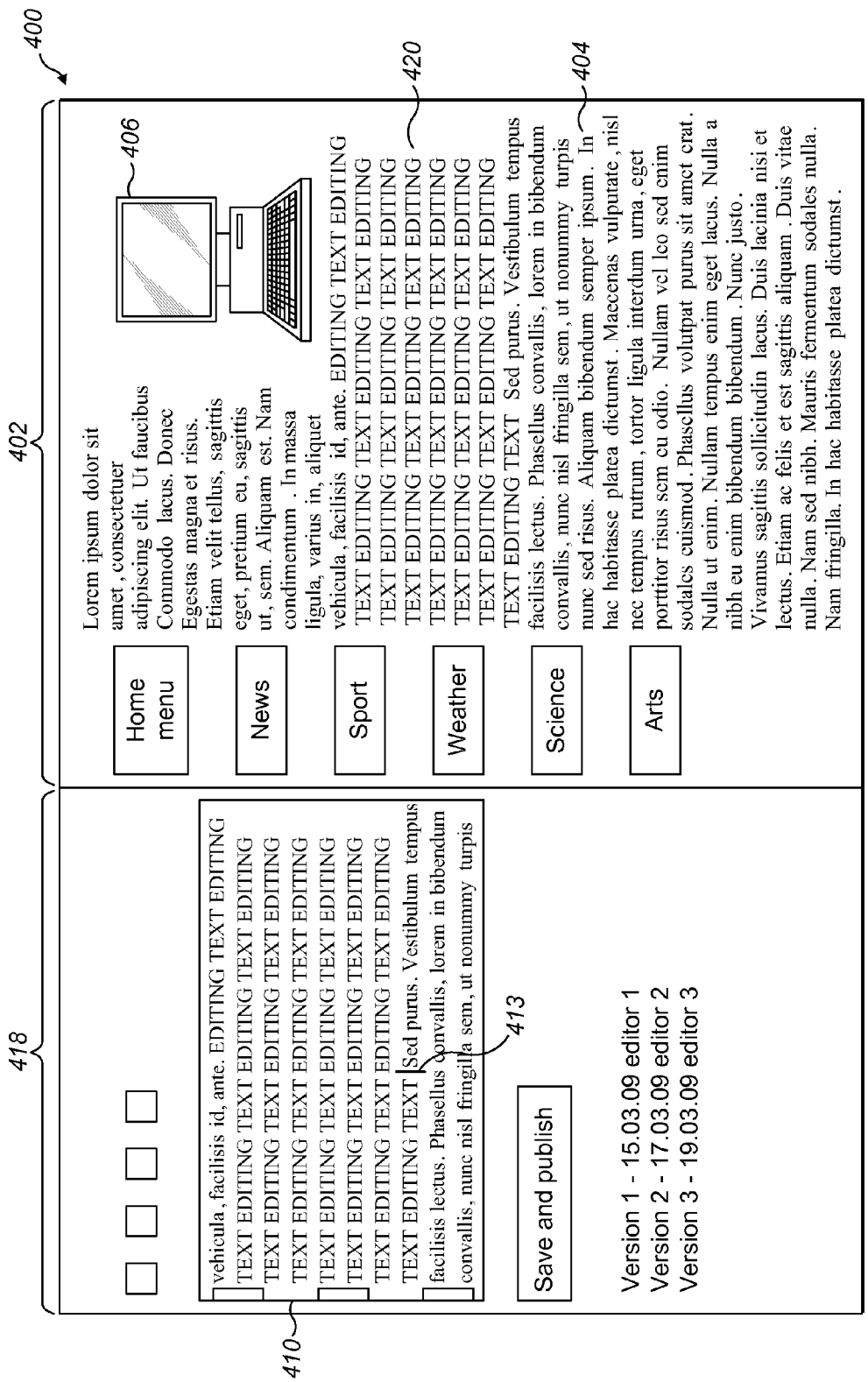
FIG. 6 shows schematically an interface according to an embodiment of the invention.

FIG. 6 shows schematically the interface 400 illustrated in FIG. 4 during editing of the webpage in accordance with an embodiment of the present invention. In this example, the user has inserted text at the position of the cursor 413 as shown in FIG. 4. The position of the cursor 413 in the second display area may be selected by a user, using the cursor control device such as a computer mouse. Having selected the cursor position, the user edits the webpage in the second display area by inputting the editing data. In the present example, as illustrated in FIG. 6, the user has added the repeated text "EDITING TEXT" 420, using for example the alphanumeric input device such as a computer keyboard. In this embodiment, the editing of the webpage is displayed in the first display area 402 whilst the user edits the webpage in the second display area 410; i.e. the editing is displayed in the first display area during the editing. The editing is displayed in the first display area 402 substantially simultaneously as the editing is made in the second display area 410; i.e. as the user inputs editing data, the user can see the webpage displayed in the first display area 402 being updated with the edits he makes as they are displayed being made to the part of the webpage displayed in the second display area 410. Accordingly, the user can preview the edited webpage as he edits the webpage. This preview may therefore be considered as a real time preview during editing. It allows the user to see during editing if any edits he makes have a detrimental effect on the layout of the webpage. For example, by comparing FIGS. 4 and 6, it can be seen that before editing the text "Fusce consectetuer" at the end of the text 404 was within the first display area 402. After adding the "EDITING TEXT" text, part of the original text, including the end phrase "Fusce consectetuer", is no longer within the first display area 402. If the periphery of the first display area 402 defines the permitted size of the article in the webpage, for example to meet layout criteria, and it is desired to include the no longer displayed text including the phrase "Fusce consectetuer" in the article, the user can advantageously see immediately the effect of adding the "EDITING TEXT" text to the layout of the webpage. This allows the user to modify his editing, for example by reducing the extent of new text added to the webpage or by deleting other parts of the text 404, to ensure that the text 404 once edited fits within the first display area 402.

In this embodiment, the at least part of the webpage displayed in the first display area 402 is displayed without editing mark-up, and without any data representative of the webpage, for example the mark-up language data and/or the webpage content data. Thus, the first display area 402 displays the webpage before, during and after editing, as it would be displayed to a webpage viewer accessing the webpage using a webpage browser application, for example via the Internet. Further, the viewer may be able to select a particular document viewing application, in this example a webpage browsing application, for displaying the edited webpage in the first display area. Thus, the edited webpage may be viewed with the layout as would be displayed by different webpage browsing applications, such as the MICROSOFT® INTERNET EXPLORER® browsing application or the MOZILLA® FIREFOX® browsing application, to ensure the edited webpage will be presented acceptably for viewers using different viewing applications.

The part of the webpage displayed in the first and second display areas 402, 410 may be changed. For example, a user may move the webpage using for example a mouse to use scrolling buttons provided for the first and/or second display areas, and/or resizing tools, to display a different part of the webpage. The webpage browsing application interprets the user input from the mouse and renders different parts of the webpage appropriately. In an embodiment, the part of the webpage displayed in the second display area 410 is also displayed in the first display area 402, although in some embodiments the part of the webpage displayed in the second display area 410 may not be displayed simultaneously in the first display area 402.

A user may select a part of the webpage for editing. For example, a user may access a webpage for editing in the first display area 402, and select a part of the website for editing, for example using the cursor control device. The selected part may then be displayed in the second display area 410, ready for editing. In other embodiments, either of the second display area 410 and the webpage editing console 418 may be generated upon selecting of a part of the webpage for editing. Thus, the second display area is provided in response to a user input. Once editing is complete, the second display area 410 and the webpage editing console 418 may then be closed, until a further webpage part is selected for editing. In other embodiments of the invention, the position and/or size of the first and second display areas 402, 410 may be changed. Further, the method may include hiding the second display area. The second display area may then be revealed on demand by the user. For example, a user could review the webpage displayed in the first display area with the second display area hidden or closed, to provide a maximum viewing area for viewing the webpage, and then reveal or generate the second display area when wanting to edit a part of the webpage.

In other embodiments, the method includes overlapping the first display area and the second display with each other. For example, a user may position and/or resize at least one of the first and second display areas to overlap with each other. Alternatively, a predetermined overlap of the first and second display areas may be provided for; a user may initiate this overlap by for example using a button provided in the editing console 418. With reference to FIG. 4, it is envisaged that the second display area 410, and perhaps the webpage editing console 418, may be overlapped at least partially with the first display area 402. For example, the webpage editing console 418 may be slid sideways, over the first display area 402, without changing a size of the webpage editing console 418 or a position and size of the second display area 410.

Figure 7:
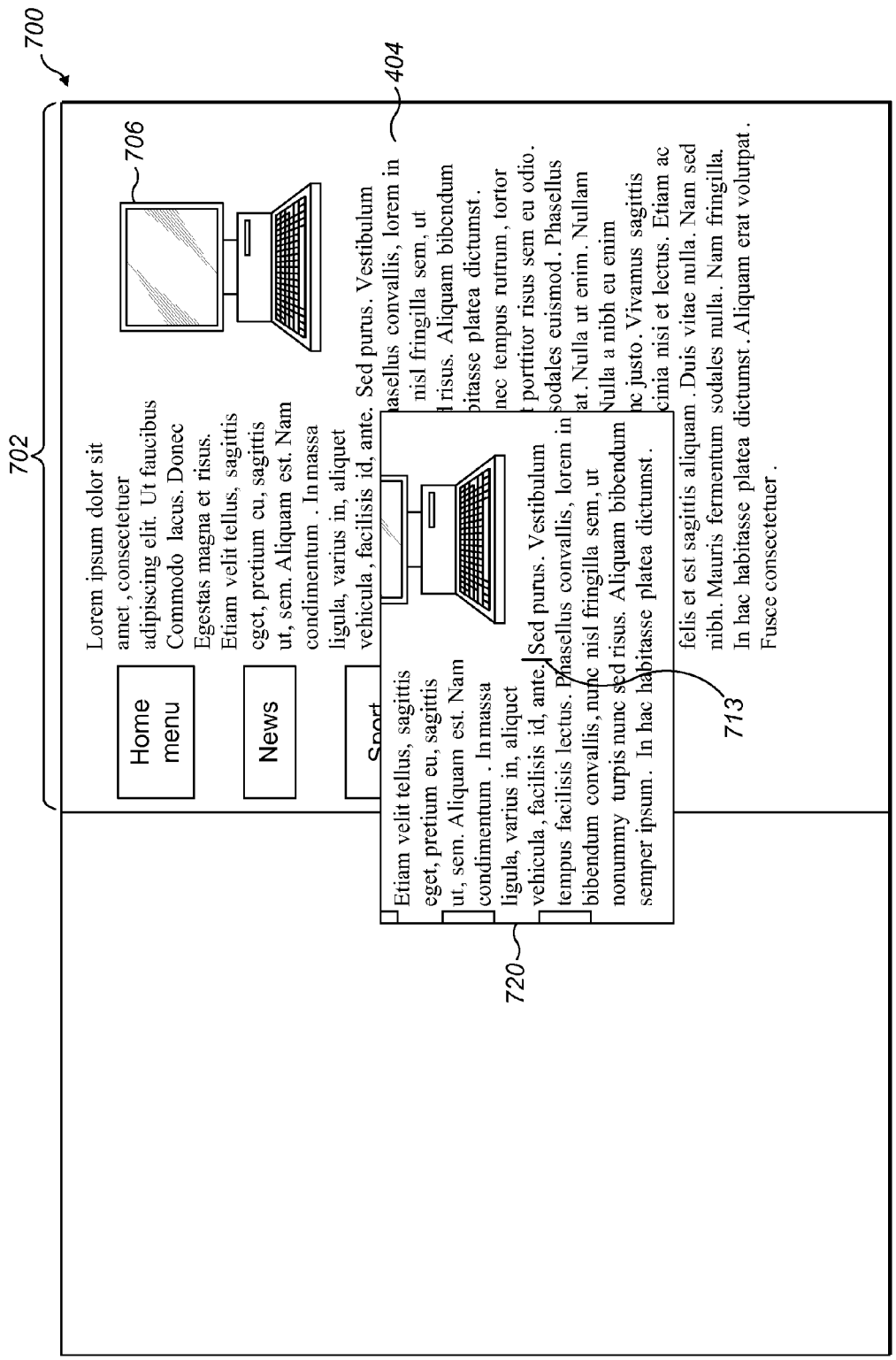
FIG. 7 shows an interface according to an alternative embodiment of the invention.

FIG. 7 shows an alternative interface 700 according to an embodiment of the present invention. Features described herein are similar to those described previously for FIG. 4, and are therefore referred to using the same reference numerals incremented by 700; corresponding descriptions should be taken to apply also. In this embodiment, the second display area 720 may be overlapped with the first display area 702, as illustrated. A webpage editing console is not provided in this embodiment; in other embodiments the console may be provided.

With the first display area 702 and the second display area 710 overlapping, the overlying one of the first and second display areas may be opaque so that the part of the underlying display area is obscured, or completely transparent. Alternatively, the overlying display area may be partially transparent, so that the user can see the webpage contents in both of the portions of the first and second display areas which overlap. Further, if a webpage editing console is provided, and overlies a display area, the console may be opaque, completely transparent, or partially transparent to show the contents of the underlying display area. Such partial transparency may assist a user in editing the webpage. For example, if the second display area overlies the first display area, the partial transparency of the second display area allows the user to view the editing in the first and second display areas, or to view a different part of the webpage in the first display area from the part displayed in the second display area.

By overlapping the first and second display areas, the method may include overlapping content displayed in the first display area with content displayed in the second display. In a special embodiment, the method includes arranging the content of the at least part of the webpage displayed in the second display area and/or the content of the at least part of the webpage displayed in the first display area to be coincident with each other (not illustrated). This means that the content in the overlying and underlying display areas, or overlapping parts of the display areas, are identical and are of the same size, so that the overlying content aligns with the underlying content. In such an embodiment, with the overlying display area being partially transparent, any editing made in the second display area and displayed in the first display area would be displayed as occurring together, rather than being shown separately.

In further embodiments, the method includes accessing a further document, in this example a webpage, using the first display area. In this example where the document is a webpage, the user may navigate to a different webpage by interacting with the webpage displayed in the first display area using the mouse. For example, he could use one of the buttons 408 described previously, such as the news button to access a news webpage. Alternatively, the user may input to the webpage browser application an address of a webpage he wishes to navigate to. The navigation functionality may be provided by the webpage browser application. The user may then edit the further document, in this example the further webpage, in accordance with the present invention, namely by a method including receiving data associated with the further document; processing the data associated with the further document to render at least part of the further document for display in the second display area and in the first display area, and displaying as rendered the at least part of the further document in the second display area and in the first display area; receiving further editing data for editing the at least part of the further document; processing the further editing data, thereby editing the at least part of the further document in the second display area and applying the editing of the at least part of the further document to the at least further part of the document displayed in the first display area.

Figure 8:
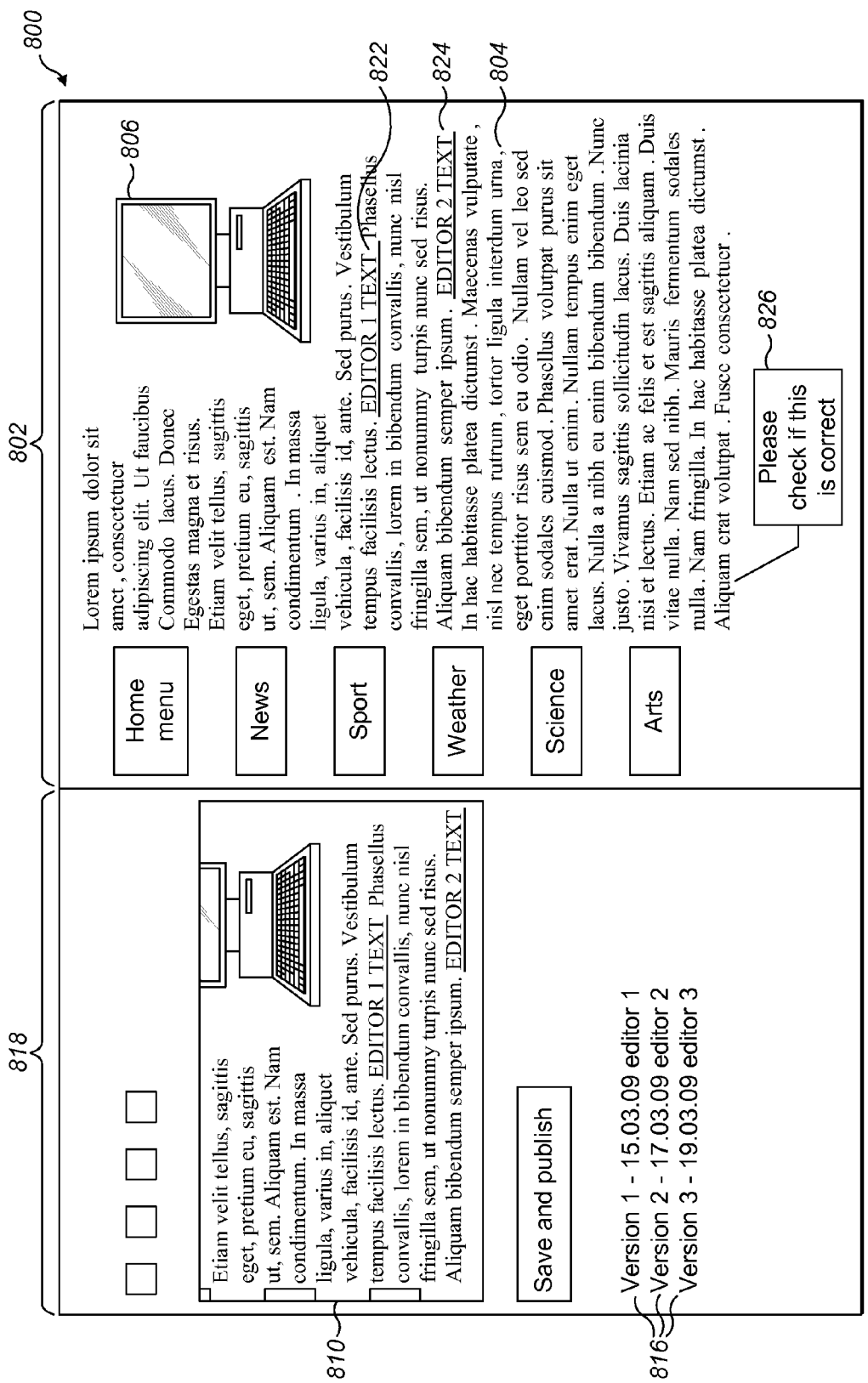
FIG. 8 shows an interface of a further embodiment of the invention.

FIG. 8 shows an example interface 800 in accordance with a further embodiment of the invention. Features described herein are similar to those described previously for FIG. 4, and are therefore referred to using the same reference numerals incremented by 800; corresponding descriptions should be taken to apply also. In this embodiment, the method includes storing data associated with the edited at least part of the document as a first edited version. Further, the method may include receiving further editing data; processing the further editing data, thereby further editing the at least part of the document displayed in the second display area and applying the further editing to the further edited at least part of the document displayed in the first display area; and storing as a second edited version data associated with the further edited at least part of the document. Thus, the edited webpage described in previous embodiments may be further edited according to the method of the present invention.

A webpage may be edited by multiple users, for example a first editor and a second editor, to generate multiple edited versions of the webpage. Therefore, the first edited version may be generated by the first editor and the second edited version may be generated by the second editor. As described previously, a user, for example the first editor, may edit the webpage and store data associated with the edited webpage, for example on a webpage hosting server. The webpage may then be edited further, for example by the second editor. The second editor may edit the original webpage, i.e. the unedited webpage associated with the data received by the computer system, or may edit the first edited version of the webpage. Once the second editor has completed his editing, data associated with the second edited version is transmitted and stored, for example on the webpage hosting server, in a similar manner as described previously. The first and second edited versions may not be publicly available from the webpage hosting server; a final edited version may be prepared by a further editor to incorporate at least some of the editing in the first and second edited versions, and then made available for public access.

A user may select at least one of the first and second edited versions, and thus display the selected at least one version in the first display area 802. The user may select a version by for example using the cursor control device to select one of the links 816 corresponding to the version for viewing. When one version is selected for displaying, data associated with the selected version is received by the webpage browsing application, for example from the webpage hosting server, or alternatively from the machine readable medium of the computer system, or another data source where the data is stored. The data associated with the edited version may include a time stamp of when the version was created, and details of who created the version. The time stamp and editor information may be presented in the links 816 to aid the user select a version to view. The webpage browser application renders the selected edited version using the received version data and displays the version in the first display area. The user may then edit the displayed version using the second display area, as described previously, to generate a further edited version.

A selected edited version may be displayed without editing mark-up. Alternatively, the editing may be indicated to the user, to identify the editing made to the original webpage. Referring to FIG. 8, "EDITOR 1 TEXT" text 822 inserted by the first editor is marked-up as underlined text.

A user may wish to view more than one edited version simultaneously. The method of the invention may include comparing data of one of the original webpage received by the computer system before editing, the first edited version and the second edited version with data of a different one of the original webpage, the first edited version and the second edited version. Accordingly, the user may select to view the first and second edited versions simultaneously, by selecting two of the links 816 together for example. A comparison algorithm is performed, to compare the data associated with the first edited version and the data associated with the second edited version. This comparison may be performed on the webpage hosting server, or by the processor of the computer system, for example. Comparison data is generated from the comparison which identifies differences between the selected versions, in this case the first and second versions. The comparison data is received by the webpage browser application, for example, and is processed to display in the first display area 802 a webpage which incorporates the first and second versions. Differences between the compared versions are indicated with mark-up. For example, as illustrated in FIG. 8, "EDITOR 2 TEXT" text 824 inserted by the second editor is marked-up as underlined text. In this example, the first and second editors have edited different parts of the webpage. In other embodiments, the first and second editors may differently edit the same portion of the webpage; in such an example a webpage may be displayed which shows the different edits of the same portion made by the different editors. Edits made by different editors may be marked-up using different colours, or using other mark-up, for example labels.

During editing of the webpage, the first editor and the second editor may attempt to edit the same part of the webpage simultaneously. This may be problematic, since whichever editor saves their edited version later may overwrite the previously edited version. To avoid this, the method of the invention may include preventing one of the editors, for example the second editor, from editing at least part of the webpage during editing of the webpage by the other editor, for example the first editor. The method may include notifying the second editor that at least part of the webpage is being edited by the first editor.

In further embodiments of the invention, the method includes annotating at least part of the webpage and storing data associated with the annotating as part of the first edited version, and/or the second edited version. Referring to FIG. 8, an annotation 826 is illustrated. Such an annotation may be inserted to make a note in respect of editing the webpage. For example, the first editor may raise a question for the second editor to consider when subsequently editing the webpage.

It is envisaged in further embodiments that a user viewing the webpage with mark-up which indicates edits made and/or annotations in the first display area may hide the mark-up and/or annotations, so as to view the edited webpage with a layout as would be displayed by a webpage browser application.

In accordance with a further aspect of the present invention, there is provided a method of editing a document, the method including: receiving data associated with a document, the data including mark-up language data; processing the data to render at least part of the document for display in a display area, and displaying as rendered the at least part of the document in the display area; receiving editing data; and processing the editing data, thereby editing the at least part of the document displayed in the display area. In embodiments of the invention, the method includes displaying during editing the at least part of the document in the display area without editing mark-up. In other embodiments, no editing mark-up may be indicated, except for a marker, such as a cursor, for indicating in the display area a position for editing the displayed document. In further embodiments, the document may be a webpage. Features of embodiments of the method of the invention described previously may be included in the method of this aspect of the invention.

The method of described embodiments of the invention may be performed by the computer system, for example using computer software such as a webpage browser application. The webpage browser application itself may be configured to receive data associated of a webpage for editing and to provide the method of the invention. Alternatively, received data associated with a webpage for editing may include data which is arranged to provide the method of the present invention when processed by computer software; for example the data may include code written in the JAVASCRIPT® language which is arranged to provide the method and functionality of the present invention when loaded into and processed by a webpage browser application. The method of the present invention is described as being implemented using a computer system. The method may be provided by a remote computer system to a local user, via a local interface accessing the remote system. In other embodiments, the method may be provided by a combination of processing by the computer system and a remote computer system, for example.

In order to edit a document in accordance with the present invention, an editor may be required to enter a username and password, in order to edit the document. This security prevents unauthorised editing of the document. For a webpage, the webpage hosting server, for example, may therefore provide two available copies of the webpage; a first copy for public access, and a second copy for editing. Once the second copy has been edited, the first copy may be replaced with the edited copy. The security may be controlled by the webpage hosting server, or by a webpage browser application.

A document, such as a webpage, may be enabled for editing using the method of the present invention. In one embodiment of the invention, there is provided a method of processing data associated with a document, the method including receiving data associated with the document; processing the data and generating modified data including data for providing editing of the document in accordance with the method of editing the document of the present invention. In this way, data representative of a webpage, for example HTML and webpage content data, may be modified to add data such as JAVASCRIPT® code which codes for providing editing of the webpage in accordance with the present invention. Thus, the modified data when loaded and processed by a webpage browser application may allow the webpage then to be edited according to the present invention. Computer software may be used to modify the webpage data in this way. Alternatively, webpage data may be submitted from a local computer system to a remote computer system for processing in order to modify the webpage data. The modified webpage data may then be transmitted back to the local computer system for editing.

According to further aspects of the present invention, there is provided computer software arranged to perform the method of the present invention. This computer software may be stored on a data carrier, such as a data storage medium for example an optical disc, or a solid state recording medium such as a solid state drive. Alternatively, or additionally, the computer software may be provided by a transfer over a network, for example by downloading from a remote computer system. The present invention further provides apparatus arranged to perform a method in accordance with the present invention.

The above embodiments are to be understood as illustrative examples of the invention. Further embodiments of the invention are envisaged. For example, editing of a document has been described for editing text of a webpage. Editing of other documents and of other content of a document is envisaged within the scope of the appended claims. For example, editing a document may include adding, modifying and/or deleting content of a document. Any such additions, modifications and/or deletions may be referred to herein as edits. The content for editing may include text, an image, a graphic element, a hyperlink, form data, a table, a sound element, a video element and/or an animation element. Any type of content provided in a document, either displayed or including sound for example, is envisaged for editing in accordance with the method of the present invention. For a webpage the content may further include an inline frame referring to a webpage, and/or any other type of content provided by a webpage. The content may be provided using the FLASH® language, or suchlike. In one embodiment, if the webpage data for editing includes HTML and embedded JAVASCRIPT® code, a user may edit, using the method of the present invention, webpage attributes of the JAVASCRIPT® code, but not the JAVASCRIPT® code itself. Moreover, a user may edit where and/or how in a webpage the JAVASCRIPT® code functionality is provided. Similarly, in other embodiments, if the webpage data includes FLASH® data, a user may edit attributes of the FLASH® data, how and/or where in the webpage as displayed the FLASH® element would be rendered by the webpage browser application.

In other envisaged embodiments, the method of the present invention may include providing functionality for a user to write and edit JAVASCRIPT® code, or an alternative code format such as the FLASH® format or CSS. Once writing of code for such functionality is completed, for example of an algorithm written using JAVASCRIPT® code, a user may insert the completed functionality into the webpage being edited, as a new webpage content object, using an appropriate editing tool. Once inserted, the webpage as edited, including the new content object, may be previewed in the first display area 402. Similarly, a user could insert such a content object which has been previously written by a different user.

Examples have been given above of editing tools, such as for editing a size or font of text. Other editing tools are envisaged to enable any document and the content thereof to be added, modified or deleted.

In embodiments described, the method of the invention may be provided in a using HTML data and JAVASCRIPT® data. In other embodiments, the method may be provided using functionality coded in other data formats. For example, eXtensible Markup Language (XML) and/or Asynchronous JavaScript and XML (AJAX) and/or CSS may be used. Any of the alternative languages described above may also be used to provide the method of the invention, for example any tag defined in accordance with the W3C, such as part of HTML and/or XHTML.

In examples given above, computer software such as a webpage browsing application operating on a computer system has been described for rendering a document and for providing the method of the invention. Other embodiments are envisaged of computer software arranged to render a document and to provide the method of the present invention, for example computer software for handling electronic documents.

Methods in accordance with the present invention have been described as a series of steps. Further embodiments are envisaged where the described steps may be performed in a different order from the order in which they are described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of editing a document, the method including:
   a) receiving data associated with the document, the data including mark-up language data;
   b) processing the received data to render at least part of the document for display in a first display area of a display, and displaying as rendered the at least part of the document in the first display area, wherein the rendering comprises formatting the at least part of the document based on the mark-up language data;
   c) processing the received data to render the at least part of the document for display in a second display area of the display, and displaying as rendered the at least part of the document in the second display area, wherein the rendering comprises formatting the at least part of the document based on the mark-up language data;
   d) receiving editing data;
   e) editing the at least part of the document displayed in the second display area using the editing data, and applying said editing to the at least part of the document displayed in the first display area;
   f) storing data associated with the at least part of the document edited in e) as a first edited version;
   g) receiving further editing data;
   h) further editing the at least part of the document displayed in the second display area using the further editing data and applying the further editing to the edited at least part of the document displayed in the first display area; and
   i) storing as a second edited version data associated with the further edited at least part of the document.

2. A method according to claim 1, including simultaneously displaying the first display area and the second display area.

3. A method according to claim 2, including in e) displaying the editing in the first display area during said editing.

4. A method according to claim 1, including in e) displaying the editing in the first display area during said editing.

5. A method according to claim 4, including in e) displaying the editing in the first display area simultaneously as making the editing in the second display area.

6. A method according to claim 1, including displaying the at least part of the document in the first display area without mark-up indicative of editing.

7. A method according to claim 1, including displaying the edited at least part of the document in the first display area in accordance with a selected document viewing application.

8. A method according to claim 1, including transmitting data associated with the edited at least part of the document to a server apparatus.

9. A method according to claim 1, including providing the second display area in response to a user input.

10. A method according to claim 1, including selecting at least part of the document for editing and displaying the selected at least part of the document in the second display area.

11. A method according to claim 1, including hiding the second display area.

12. A method according to claim 1, including moving the second display area with respect to the first display area.

13. A method according to claim 1 including overlapping the first display area and the second display area.

14. A method according to claim 13, including overlapping content of the document displayed in the second display area with content of the document displayed in the first display area.

15. A method according to claim 14, including arranging the content of the at least part of the document displayed in at least one of: the second display area and the first display area to be coincident with each other.

16. A method according to claim 1, including selecting and displaying in the first display area the first edited version.

17. A method according to claim 1, including annotating said at least part of the document, and storing data associated with said annotating as part of the first edited version.

18. A method according to claim 1, including selecting and displaying in the first display area at least part of at least one of: the first edited version and the second edited version.

19. A method according to claim 1, including annotating said at least part of the document, and storing data associated with said annotating as part of at least one of: the first edited version and the second edited version.

20. A method according to claim 1, including comparing the document associated with the data received in a) and the first edited version, and indicating at least one difference between the document associated with the data received in a) and the first edited version.

21. A method according to claim 1, including preventing a second editor from editing at least part of the document during editing of the document by a first editor.

22. A method according to claim 21, including notifying the second editor that at least part of the document is being edited by the first editor.

23. A method according to claim 1, including in e) editing content of the at least part of the document, the content including at least one of: text, an image, a graphic element, a hyperlink, a form, a table, an inline frame, a sound element, a video element and an animation element.

24. A method according to claim 1, including accessing a further document using the first display area.

25. A method according to claim 24, including:
receiving data associated with the further document;
processing the data associated with the further document to render at least part of the further document for display in the second display area and in the first display area, and displaying as rendered the at least part of the further document in the second display area and in the first display area;
receiving further editing data for editing the at least part of the further document; and
editing the at least part of the further document in the second display area using the further editing data and applying the editing of the at least part of the further document to the at least part of the further document displayed in the first display area.

26. A method according to claim 1, wherein the document is a webpage.

27. A computer program product comprising a non-transitory computer-readable storage medium having computer-readable instructions stored thereon, the computer-readable instructions being executable by a computerised device to cause the computerised device to perform a method of editing a document in accordance with claim 1.

28. Apparatus comprising a processor, arranged to perform the method of claim 1.

29. A method of processing data associated with a document, the method including:
receiving first data associated with the document; and
processing said first data and generating modified data including data for providing editing of the document, wherein the editing of the document includes:
a) receiving second data associated with the document, the second data including mark-up language data and the data for providing editing of the document;
b) processing the received second data to render at least part of the document for display in a first display area of a display, and displaying as rendered the at least part of the document in the first display area, wherein the rendering comprises formatting the at least part of the document based on the received second data;
c) processing the received second data to render the at least part of the document for display in a second display area of the display, and displaying as rendered the at least part of the document in the second display area, wherein the rendering comprises formatting the at least part of the document based on the received second data;
d) receiving editing data;
e) editing the at least part of the document displayed in the second display area using the editing data, and applying said editing to the at least part of the document displayed in the first display area;
f) storing data associated with the at least part of the document edited in e) as a first edited version;
g) receiving further editing data;
h) further editing the at least part of the document displayed in the second display area using the further editing data and applying the further editing to the edited at least part of the document displayed in the first display area; and
i) storing as a second edited version data associated with the further edited at least part of the document.

* * * * *